(12) United States Patent
Hegemann et al.

(10) Patent No.: US 9,274,213 B2
(45) Date of Patent: Mar. 1, 2016

(54) METHOD FOR CALIBRATING A PLURALITY OF ENVIRONMENT SENSORS IN A VEHICLE

(71) Applicants: Conti Temic microelectronic GmbH, Nuremburg (DE); Continental Teves AG & Co. oHG, Frankfurt (DE)

(72) Inventors: Stefan Hegemann, Wangen (DE); Matthias Komar, Frankfurt (DE); Stefan Lueke, Bad Homburg (DE)

(73) Assignees: Conti Temic microelectronic GmbH, Nuremberg (DE); Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/377,297

(22) PCT Filed: Sep. 9, 2013

(86) PCT No.: PCT/DE2013/200163
§ 371 (c)(1),
(2) Date: Aug. 7, 2014

(87) PCT Pub. No.: WO2014/044272
PCT Pub. Date: Mar. 27, 2014

(65) Prior Publication Data
US 2015/0012172 A1    Jan. 8, 2015

(30) Foreign Application Priority Data

Sep. 20, 2012  (DE) .................. 10 2012 108 862

(51) Int. Cl.
*G08G 1/01*     (2006.01)
*G01S 7/40*     (2006.01)
(Continued)

(52) U.S. Cl.
CPC . *G01S 7/40* (2013.01); *G01S 7/497* (2013.01); *G01S 7/52004* (2013.01);
(Continued)

(58) Field of Classification Search
CPC ....... B60W 40/10; G08G 1/20; G01S 5/0027; G06K 9/00818; G06T 7/0018
USPC .............. 701/45, 117, 408, 423, 36; 340/937, 340/935, 8.1, 933; 382/103, 104, 181
See application file for complete search history.

(56) References Cited

U.S. PATENT DOCUMENTS 4,470,124 A * 9/1984 Tagami et al. .................. 702/87
5,857,160 A * 1/1999 Dickinson et al. .............. 701/41
(Continued)

FOREIGN PATENT DOCUMENTS

DE    198 29 162    1/2000
DE    100 28 130    12/2001
(Continued)

OTHER PUBLICATIONS

International Search Report of the International Searching Authority for International Application PCT/DE2013/200163, mailed Dec. 18, 2013, 2 pages, European Patent Office, HV Rijswijk, Netherlands.
(Continued)

*Primary Examiner* — Dalena Tran
(74) *Attorney, Agent, or Firm* — W. F. Fasse

(57) ABSTRACT

A method and a device are provided for calibrating a plurality of environment sensors in a vehicle. Traffic light signals are detected and identified from the data of at least one environment sensor or from data received by a car-2-X communication unit. A calibration of the plurality of environment sensors is activated and performed in response to a determination that a traffic light signal pertaining to the vehicle has turned red.

18 Claims, 2 Drawing Sheets

(51) Int. Cl.
*G01S 7/52* (2006.01)
*G01S 13/93* (2006.01)
*G01S 13/86* (2006.01)
*G01S 7/497* (2006.01)
*G01S 15/93* (2006.01)
*G01S 13/52* (2006.01)

(52) U.S. Cl.
CPC ............ *G01S 13/862* (2013.01); *G01S 13/867* (2013.01); *G01S 13/931* (2013.01); *G01S 13/52* (2013.01); *G01S 15/931* (2013.01); *G01S 2013/936* (2013.01); *G01S 2013/9325* (2013.01); *G01S 2013/9367* (2013.01); *G01S 2013/9375* (2013.01); *G01S 2013/9378* (2013.01); *G01S 2013/9385* (2013.01)

(56) References Cited

U.S. PATENT DOCUMENTS

| | | | | |
|---|---|---|---|---|
| 6,778,928 | B2 * | 8/2004 | Stiller | 702/104 |
| 7,684,945 | B2 * | 3/2010 | Walter et al. | 702/96 |
| 8,700,277 | B2 | 4/2014 | Staudinger et al. | |
| 8,760,962 | B2 | 6/2014 | Kloss | |
| 2009/0089002 | A1 | 4/2009 | Walter et al. | |
| 2012/0281881 | A1 | 11/2012 | Walter | |

FOREIGN PATENT DOCUMENTS

| | | |
|---|---|---|
| DE | 102007043905 | 5/2008 |
| DE | 102009009227 | 10/2009 |
| DE | 102009002387 | 10/2010 |
| DE | 102009040252 | 3/2011 |
| DE | 102009047284 | 6/2011 |
| WO | WO 2007/121720 | 11/2007 |
| WO | WO 2010/127650 | 11/2010 |
| WO | WO 2011/063785 | 6/2011 |

OTHER PUBLICATIONS

PCT Written Opinion of the International Searching Authority for International Application PCT/DE2013/200163 (in German), mailed Dec. 18, 2013, 10 pages, European Patent Office, Rijswijk, Netherlands.

German Search Report for German Application No. 10 2012 108 862.4, dated Jul. 19, 2013, 5 pages, Muenchen, Germany, with English translation, 5 pages.

PCT International Preliminary Report on Patentability including English Translation of PCT Written Opinion of the International Searching Authority for International Application PCT/DE2013/200163, issued Mar. 24, 2015, 8 pages, International Bureau of WIPO, Geneva, Switzerland.

* cited by examiner

METHOD FOR CALIBRATING A PLURALITY OF ENVIRONMENT SENSORS IN A VEHICLE

FIELD OF THE INVENTION

The invention relates to a method for calibrating a plurality of environment sensors in a vehicle, which are used in particular for driver assistance systems.

BACKGROUND INFORMATION

Environment sensors, which are used in vehicles for detecting the vehicle environment are e.g. radar, lidar, camera and ultrasonic sensors. Typically, an EOL (End of Line) calibration of environment sensors is effected after installation in the vehicle.

Individual environment sensors are already known, which can perform an automatic calibration at least for individual parameters.

WO 2007/121720 A1 discloses a method for automatic yaw angle calibration of a mono camera.

DE 102009009227 A1 discloses method for automatic adjustment of a beam sensor for a motor vehicle, which during vehicle operation independently performs a sensor adjustment without a further monitoring of the self-adjustment being necessary.

WO 2011/063785 A1 discloses a method for roll angle estimation and calibration possibility by means of a mono camera in a moving vehicle.

In order to ensure a best possible detection of the vehicle environment, data of a plurality of environment sensors are increasingly fused.

WO 2010/127650 A1 discloses a method for evaluating sensor data of an environment detection system for a motor vehicle. Detection points are entered into a two-dimensional occupancy grid, the state of a grid cell being occupied and thus "potentially not traversable", and otherwise unoccupied and thus "traversable" and the occupancy grid substantially representing a vehicle environment. The environment detection system can comprise a plurality of environment sensors, in particular a beam sensor (radar/lidar/ultrasound) and a camera sensor (mono camera/stereo camera).

SUMMARY OF THE INVENTION

It is an object of one or more embodiments of the present invention to indicate a method for optimal calibration of a plurality of environment sensors in a vehicle.

The above object can be achieved according to at least one embodiment of the invention with features as disclosed herein.

A method according to an embodiment of the invention for calibrating a plurality of environment sensors in a vehicle provides detection and identification of traffic light signals from the data of at least one environment sensor. The plurality of environment sensors are calibrated when it has been determined that a traffic light signal that is relevant for the vehicle has turned red.

An embodiment of the invention is based on the idea that if a vehicle approaches a traffic light or is already stopped at a traffic light which just turns red, it is very likely that the car will stand still for a longer period of time (typically at least 10 seconds). This time can be used for calibration of plural sensors of the vehicle, e.g. by means of automatic calibration algorithms.

In a preferred form of embodiment it is ensured that the calibration is only performed after the vehicle is stationary.

The standstill of the vehicle can be determined in particular from speed sensor data or from data of at least one environment sensor.

During the standstill of the vehicle moving objects can easily be distinguished from stationary objects on the basis of the environment sensor data, since the environment sensors are unmoved compared to the vehicle environment. In this case, stationary objects thus have no relative movement compared to the environment sensors.

According to an advantageous form of embodiment, a calibration is performed based on the data of at least one stationary object, which is detected by at least two different environment sensors while the vehicle is stationary. The calibration of the different environment sensors is performed such that after the calibration of both or all the environment sensors from said environment sensors matching data are generated for the at least one stationary object. The matching data include in particular the position of the object, the distance between the own vehicle and the object.

Thus, in particular on the basis of the detection of stationary objects a multi-sensor calibration can be performed, in which the environment sensors available in the vehicle can at least be calibrated against each other in pairs.

Preferably, the detection and identification of traffic light signals is performed from the data of a camera sensor.

In order to detect traffic light signals, preferably at least one picture of the vehicle environment can be taken with particularly a color resolution vehicle camera sensor. For the identification of traffic light signals, the at least one captured image or picture can be searched for at least one signal of a traffic light and, provided that a potential traffic light signal is found in the picture, this can be classified and verified, i.e. identified. The traffic light signal identification can be performed in particular by an electronic image processing. A "traffic light signal" is understood to refer to the entirety of traffic light signal colors shining at one time, thus e.g. only green, but also yellow-red. If no traffic light signal is found in a picture, the method can be continued with a subsequently captured image or picture.

Alternatively or cumulatively, the detection and identification of traffic light signals can be performed from the data of a vehicle communication unit (C2X). For this purpose, the traffic light can send data regarding its current traffic light signal or condition to the communication unit of the vehicle.

Advantageously, the calibration can already be prepared when it has been determined that a traffic light signal that is relevant for the vehicle has completed its green phase and will turn red in the near future. This can be done in particular by recognizing a traffic light signal turning yellow, because then it is to be expected next with a red traffic light signal.

In a preferred form of embodiment during the calibration the environment sensors work to a limited extent. For this purpose, the functionality of the environment sensors can be reduced so that only essential basic functions such as e.g. collision protection functions, functions necessary for the calibration and identification of a traffic light signal change are ensured.

Advantageously, the full scope of the functionality of the environment sensors is restored when it has been determined that a traffic light signal that is relevant for the vehicle has completed its red phase. This can in particular be recognized by the traffic light turning yellow-red.

Preferably, the calibration can be performed by the two monocular sensors of a stereo camera. The two monocular sensors of a stereo camera usually comprise a large overlapping area.

In an advantageous form of embodiment, the calibration is performed by the camera sensors of a panorama view sensor system. The panorama view sensor systems include top-view, surround-view and 360 degree sensor cluster systems.

In a preferred form of embodiment the calibration is performed by at least one environment sensor of a first type and at least one environment sensor of a second type. The data of the at least two environment sensors of the first and second type are entered into a common occupancy grid. The environment sensor of the first type can be, for example, a beam sensor and the environment sensor of the second type can be, for example, a camera sensor. The calibration of the different environment sensors is performed such that after calibration of both environment sensors both environment sensors detect a (stationary) object in the same grid field.

The invention also relates to a device for calibrating a plurality of environment sensors in a vehicle. The device includes detection and identification means for traffic light signals from data of at least one environment sensor. Calibration means for calibrating a plurality of environment sensors and a decision means are provided. The decision means activates the calibration means, when the detection and identification means determine that a traffic light signal that is relevant for the vehicle has turned red.

The invention offers the advantage that for calibrating a plurality of environment sensors a defined period of time is determined, during which the environment sensors are not or only to very limited extent required for detecting the environment in particular at a standstill of the own vehicle. A calibration at stationary objects also facilitates the calibration effort.

BRIEF DESCRIPTION OF THE DRAWINGS

The invention is described in the following on the basis of accompanying drawings and examples of embodiment, in which.

DETAILED DESCRIPTION OF PREFERRED EXAMPLE EMBODIMENTS OF THE INVENTION

Figure 1:
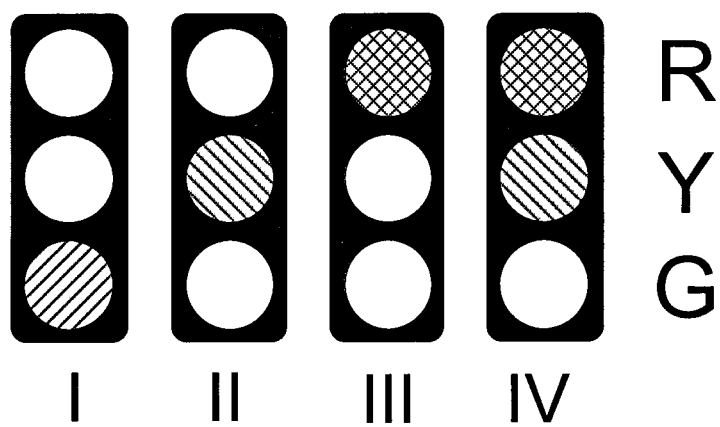
FIG. 1 shows four signals of a traffic light circuit and FIG. 2 shows various environment sensors of a vehicle with different detection ranges.

FIG. 1 shows four signals or conditions of a traffic light.

With the signal I the lower, green signal color lights up (G, ascending diagonally hatched) and the entry is released. With the signal II the middle, yellow signal color lights up (Y, descending diagonally hatched) and the driver shall wait for the next signal. With the signal III the upper, red signal color lights up (R, diagonally grid-shaped hatched) and the driver has no entry permit. In some countries with the signal IV the red and the yellow signal color (R, Y) light up together, so that the driver knows that the entry will be released shortly.

By the identification of a change from signal I to signal II from the data of a camera sensor by means of an image processing a calibration of a plurality of environment sensors can be prepared. By the identification of a change to signal III the calibration of a plurality of environment sensors can be started, in particular when it is ensured that the own vehicle is at a standstill (e.g. from speed sensor data or also from camera data).

Figure 2:
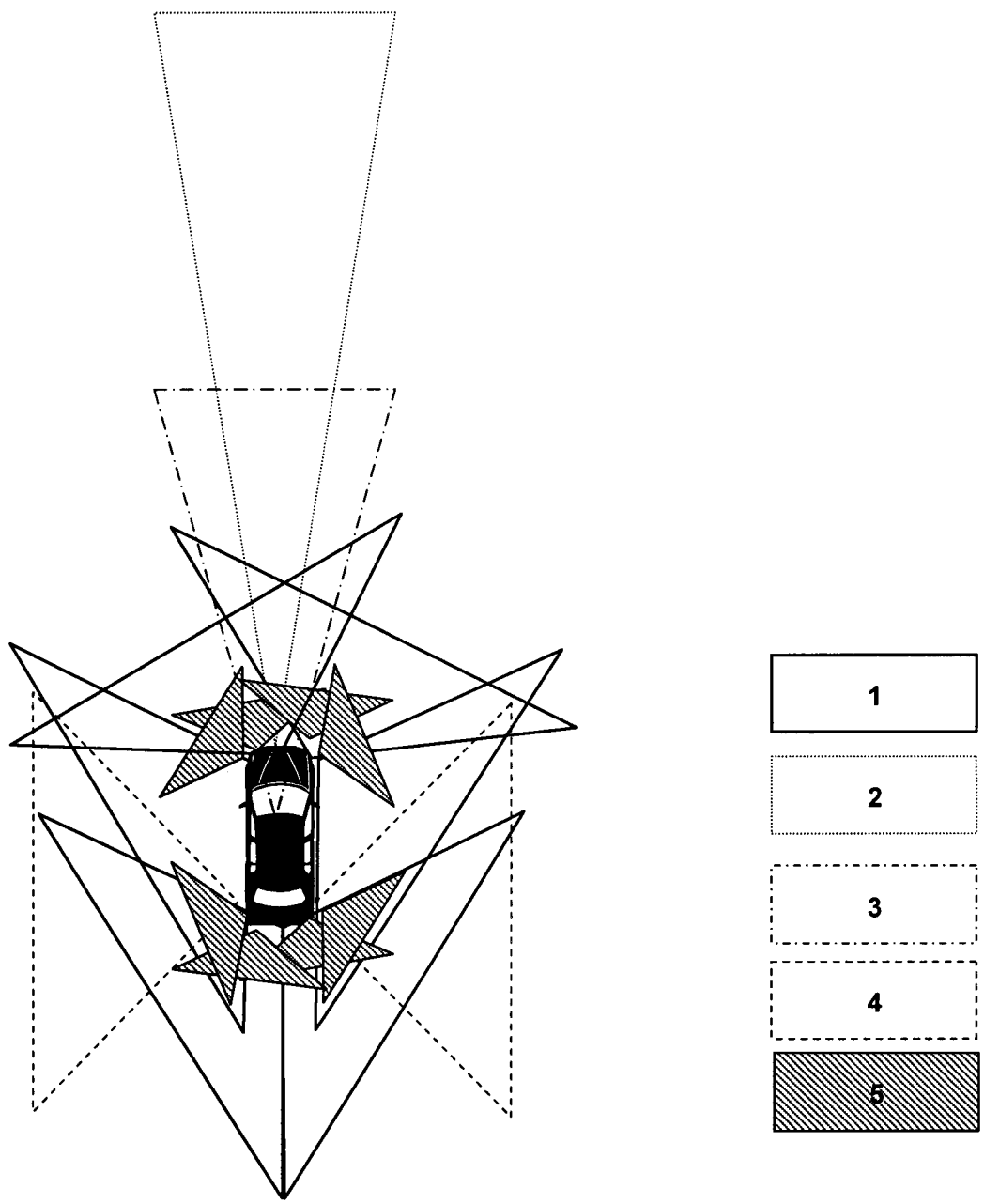

FIG. 2 schematically shows a vehicle with a plurality of environment sensors which comprise different detection ranges (1-5).

In the shown vehicle a plurality of camera sensors are arranged, which cover by their individual detection ranges (1, continuous boundary lines) the 360 degree environment of the vehicle up to medium distances, e.g. up to about 30 meters. Such a camera arrangement is used for panorama view or also top view systems. Top view systems typically provide a representation of the vehicle and its environment from a bird's eye view.

A long-range radar sensor, typically with a frequency of 79 GHz, has a detection range (2, dotted boundary line), which extends to far ahead of the vehicle (e.g. several hundred meters). Such radar sensors are often part of an ACC system (adaptive cruise control).

A stereo camera sensor monitors the area in front of the vehicle (3, dash-dotted boundary line) up to medium distances and provides spatial information on objects in this area.

Two short-range radar sensors monitor the detection ranges (4, dashed boundary lines) at the side next to the vehicle, typically with a frequency of 24 GHz. They serve in particular for blind spot detection.

Ultrasonic sensors monitor detection ranges (5, hatched areas), which are directly in front of the bumpers of the vehicle. Such ultrasonic sensors are often used for parking assistance.

If now it is determined by means of a camera sensor that a traffic light signal turns red, in case of a standstill of the own vehicle the multi-sensor calibration can be started. To this end, stationary objects can be identified, which are decreed in an overlapping detection range by at least two environment sensors. For example, a vehicle also standing at the red light can be in the detection range (2) of the long-range radar and in the detection range (3) of the stereo camera. The calibration is performed so that subsequently both environment sensors generate matching data (e.g. position of the object, the distance between the own vehicle and the object, extension i.e. size of the object) for the stationary vehicle.

In the same way stationary objects, which are both within the detection range (1) of a panorama view camera sensor and in the detection range (5) of an ultrasonic sensor can be used for their mutual calibration.

The data of these two environment sensors can be entered into a common occupancy grid. The calibration of the two environment sensors is performed such that after calibration both environment sensors detect the stationary object in the same grid field.

LIST OF REFERENCE NUMERALS

R red
Y yellow
G green
I signal I (entry free)
II signal II (wait for the next signal)
III signal III (entry prohibited)
IV signal IV (entry will be released shortly)
1 detection ranges of panorama view camera sensors
2 detection range of a long-range radar sensor
3 detection range of a stereo camera sensor
4 detection ranges of two short-range radar sensors for monitoring the blind spot regions
5 detection ranges of ultrasonic sensors

The invention claimed is:

1. A method of calibrating a plurality of environment sensors in a vehicle, comprising
performing detection and identification of a traffic light signal that is relevant for the vehicle by electronically processing data provided by at least one electronic environment sensor or by a vehicle communication unit, evaluating the data to determine whether the traffic light signal has turned red, and performing an automatic electronic calibration of a plurality of environment sensors in response to it having been determined that the traffic light signal relevant for the vehicle has turned red.

2. The method according to claim 1, further comprising electronically sensing whether the vehicle is stationary, and performing the calibration only after the vehicle is stationary.

3. The method according to claim 2, wherein the calibration is performed based on data regarding at least one stationary object in an environment of the vehicle, which stationary object is detected by at least two different ones of the environment sensors.

4. The method according to claim 1, wherein the at least one environment sensor which provides the data for the detection and identification of the traffic light signal comprises a camera sensor.

5. The method according to claim 1, wherein the detection and identification of the traffic light signal is performed with the data provided by the vehicle communication unit (Car-2-X).

6. The method according to claim 1, further comprising preparing to perform the calibration already when it has been determined that the traffic light signal relevant for the vehicle has completed a green phase.

7. The method according to claim 1, wherein during the calibration the environment sensors are functional to a limited extent.

8. The method according to claim 7, further comprising ending the calibration and restoring a full functionality of the environment sensors when it has been determined that the traffic light signal relevant for the vehicle has completed a red phase.

9. The method according to claim 1, wherein the calibration is performed by two monocular sensors of a stereo camera included among said environment sensors.

10. The method according to claim 1, wherein the calibration is performed by camera sensors of a panorama view sensor system included among said environment sensors.

11. The method according to claim 1, wherein the calibration is performed by at least one environment sensor of a first type and at least one environment sensor of a second type, and wherein the calibration comprises entering the data of the environment sensors of the first and second types into a common occupancy grid.

12. A device for calibrating a plurality of environment sensors in a vehicle, comprising a first unit for detection and identification of traffic light signals by electronically processing data of at least one environment sensor, a calibration unit for automatically electronically calibrating a plurality of environment sensors, and a decision unit that activates the calibration unit in response to when the first unit determines that a traffic light signal relevant for the vehicle has turned red.

13. A method of calibrating sensors of a motor vehicle, comprising steps:
a) in an electronic processing unit of the motor vehicle, receiving data regarding a signal state of a traffic light that pertains to the motor vehicle;
b) in the electronic processing unit, electronically processing the data to determine whether the signal state of the traffic light is a red light state; and
c) if at least the step b) determines that the signal state of the traffic light is the red light state, then in response thereto activating and performing an automatic sensor calibration of at least two sensors among plural sensors of the motor vehicle.

14. The method according to claim 13, wherein the data is data that indicates the signal state of the traffic light and that is transmitted by the traffic light, and wherein the step a) is performed by a vehicle communication unit of the motor vehicle that receives the data transmitted from the traffic light.

15. The method according to claim 13, wherein:
the plural sensors of the motor vehicle include a camera sensor,
the method further includes a step of capturing an image of the traffic light with the camera sensor and producing image data representing the image,
the data received by the electronic processing unit in the step a) is the image data, and
the electronic processing performed by the electronic processing unit in the step b) comprises electronic image processing of the image data to detect and identify the signal state of the traffic light from the image data.

16. The method according to claim 13, further comprising a step d) of electronically detecting whether the vehicle is stationary, and wherein the step c) comprises activating and performing the automatic sensor calibration only if at least both the step b) determines that the signal state of the traffic light is the red light state and the step d) detects that the vehicle is stationary.

17. The method according to claim 13, wherein the at least two sensors comprise two environment sensors that detect objects in an environment outside of the motor vehicle, and the automatic sensor calibration comprises detecting a stationary object among the objects in the environment and calibrating the two environment sensors relative to one another so that the two environment sensors respectively produce data consistent with one another regarding at least one of the position, the distance and the size of the stationary object.

18. The method according to claim 13, further comprising, in the electronic processing unit, electronically processing subsequent data regarding the signal state of the traffic light to determine whether the red light state has ended, and terminating the automatic sensor calibration in response to determining that the red light state has ended.

\* \* \* \* \*